Oct. 19, 1943.  A. SHAYNE  2,332,272
SHEET THICKNESS GAUGE FOR CONTINUOUS ROLLING MILLS
Filed April 18, 1941  3 Sheets-Sheet 2

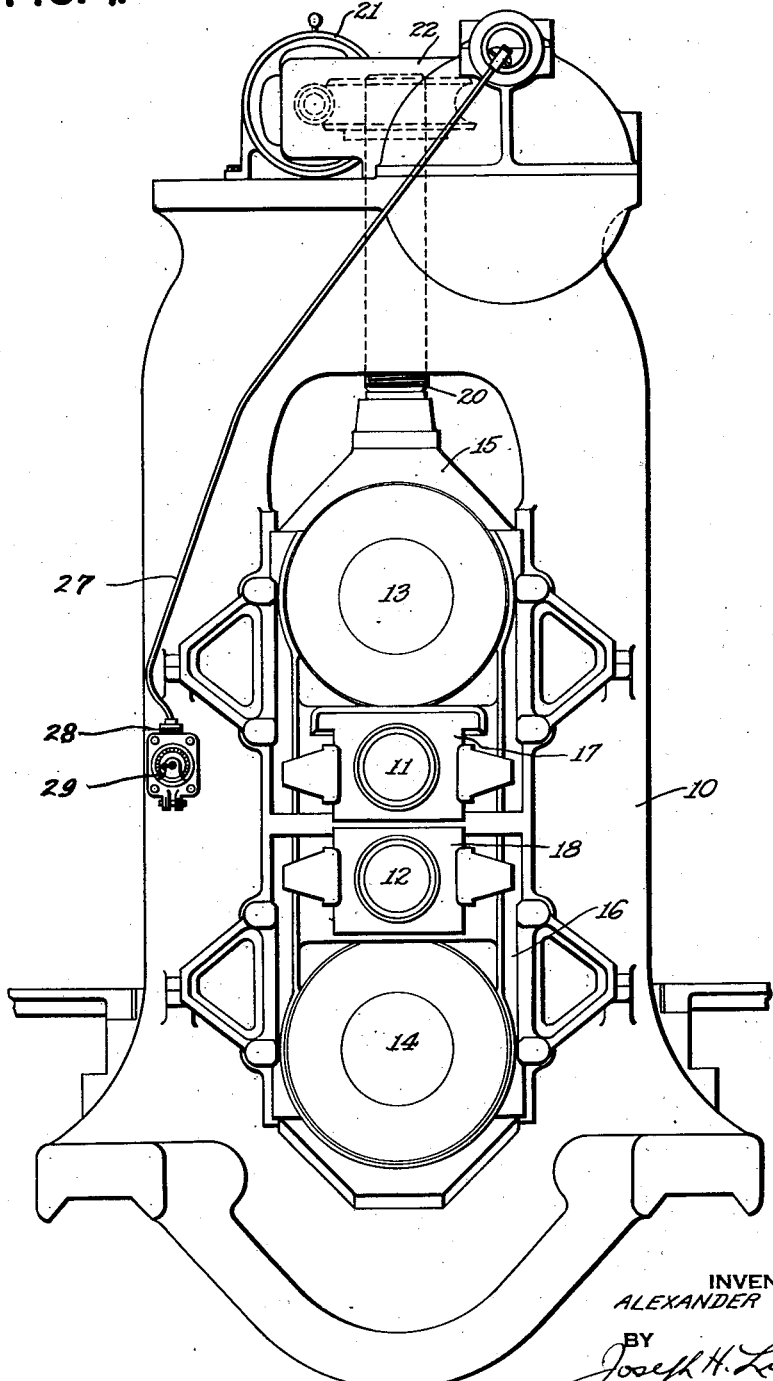

INVENTOR
ALEXANDER SHAYNE
BY
*Joseph H. Lipschutz*
ATTORNEY

Oct. 19, 1943.  A. SHAYNE  2,332,272
SHEET THICKNESS GAUGE FOR CONTINUOUS ROLLING MILLS
Filed April 18, 1941  3 Sheets-Sheet 3
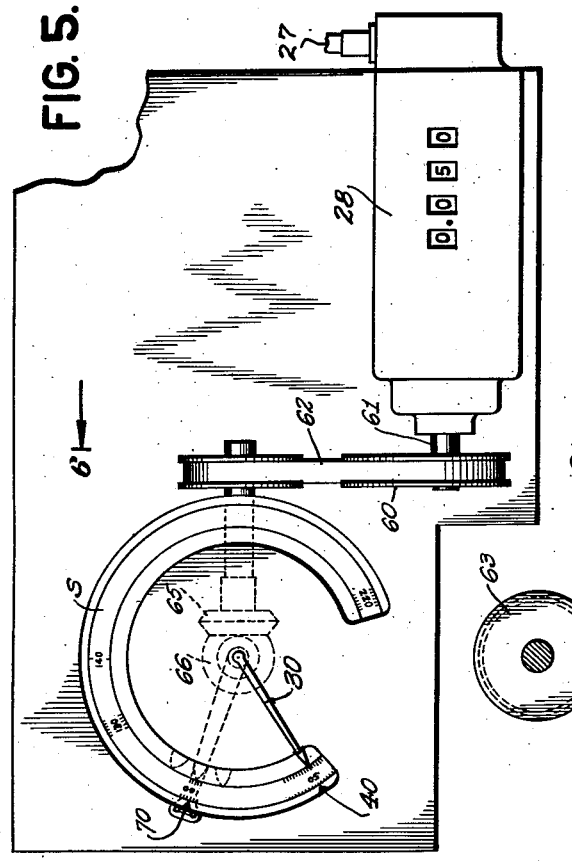
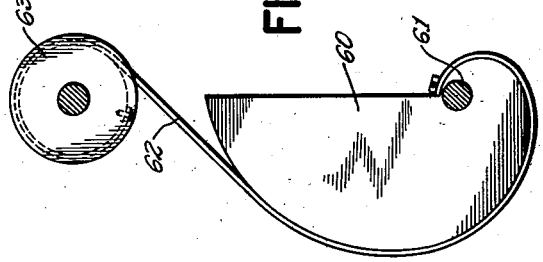
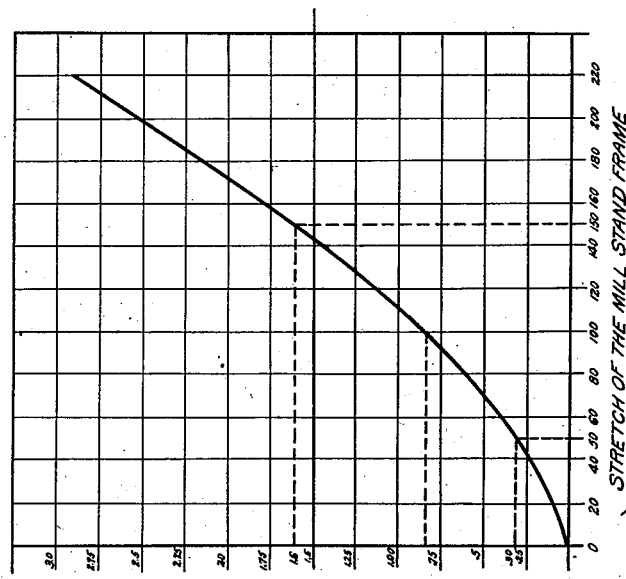
INVENTOR
ALEXANDER SHAYNE
BY
ATTORNEY Patented Oct. 19, 1943

2,332,272

UNITED STATES PATENT OFFICE 2,332,272

SHEET THICKNESS GAUGE FOR CONTINUOUS ROLLING MILLS

Alexander Shayne, New York, N. Y., assignor, by mesne assignments, to Sperry Products, Inc., a corporation of New York Application April 18, 1941, Serial No. 389,195

6 Claims. (Cl. 265—1)

This invention relates to an auxiliary instrument adapted to be employed in connection with the pressure gauge which is now utilized for the purpose of indicating strain in the mill stands of a continuous rolling mill. One such pressure gauge is disclosed in the copending application of Alexander Shayne and Bruno A. Wittkuhns, Serial No. 294,154, filed September 9, 1939, for Strain gauge for rolling mills and the like, and is based upon the principle that when the strip of material passes through the rollers of a mill stand it causes elongation of the mill stand frame and said elongation is a function of the pressure existing between the rolls and therefore of the pressure which is applied to the material.

In continuous rolling mills there is provided a series of mill stands, usually ten in number (in a hot strip mill), and the material, beginning as a slab some four inches thick, is sent through successive mill stands, each of which applies great pressure on the order of several million pounds to reduce the slab in thickness and to cause it to elongate. When finally the strip passes out of the last mill stand it is a thin sheet of perhaps a thousand feet in length. One of the problems which such continuous rolling presents is to obtain the desired thickness of sheet. Since the thickness is a function of the pressure, an accurate instrument for obtaining a reading of pressures existing between the rolls, such as provided by Shayne and Wittkuhns, cited above, is of great help in controlling the said thickness. However, until the present invention there was no instrument which could be utilized for setting the desired thickness of material to be rolled by the respective mill stand and for giving an immediate indication to the operator as to whether the desired thickness of the material was being rolled. The reason for the absence of such instrument can be accounted for by the problems which had to be solved before such instrument could be devised. One of these problems lies in the fact that although the thickness of material passing through the mill stand is a function of the pressure between the rolls, this function is not a straight line function because equal increments of pressure between the rolls do not yield equal increments of elongation of the mill stand, and, therefore, do not yield equal variations in the thickness of material.

The second problem which confronted one who would design an instrument of this type arose from the fact that in the successive mill stands the rolls are brought progressively closer together, until in the last several mill stands the rolls are not only not separated but are under initial pressure, that is, preloading pressure. Furthermore, there was no means for indicating to the operator at all times the degree of preloading in terms corresponding to actual units of elongation of the mill stand frame. This knowledge is essential for the reason stated above, for if it requires greater pressure to effect equal variation in thickness the more the mill stand is loaded, the preload is an index of the amount of additional pressure which will be required to produce the required decrease in thickness of the material passing through the mill stand. Also, a continuous indication of the preload enables the operator to control the preload to produce the necessary pressure on the material.

It is the principal object of this invention, therefore, to provide an instrument which will accomplish three functions: First, to indicate to an operator at all times preload in terms of units of elongation of the mill stand frame; second, to provide an instrument which will enable the operator to set the desired thickness in relation to the pressure gauge in spite of the fact that equal increments of pressure produce progressively smaller decrements of thickness; and third, to provide an instrument which will permit an operator to determine instantly whether or not the material passing through the rolls is of the desired thickness.

Further objects and advantages of this invention will become apparent in the following detailed description thereof.

In the accompanying drawings,

Fig. 1 is an end view of one mill stand showing my invention applied thereto.

Fig. 4 is a graph showing the mill housing elongation plotted against load or pressure between the rolls.

Fig. 5 is a front elevation of a modified form of my invention.

Fig. 6 is a section taken on the line 6—6 of Fig. 5.

Figure 3:
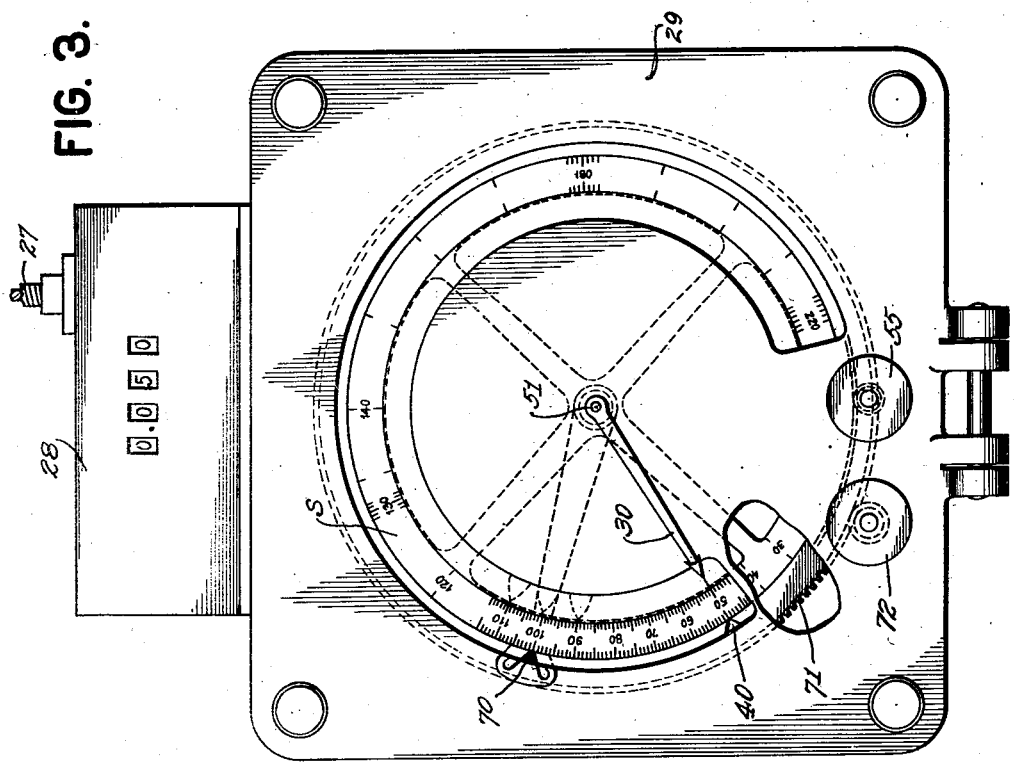
Fig. 3 is a front elevation of the instrument, with parts broken away, showing the thickness gauge and preload indicator.
Figure 2:
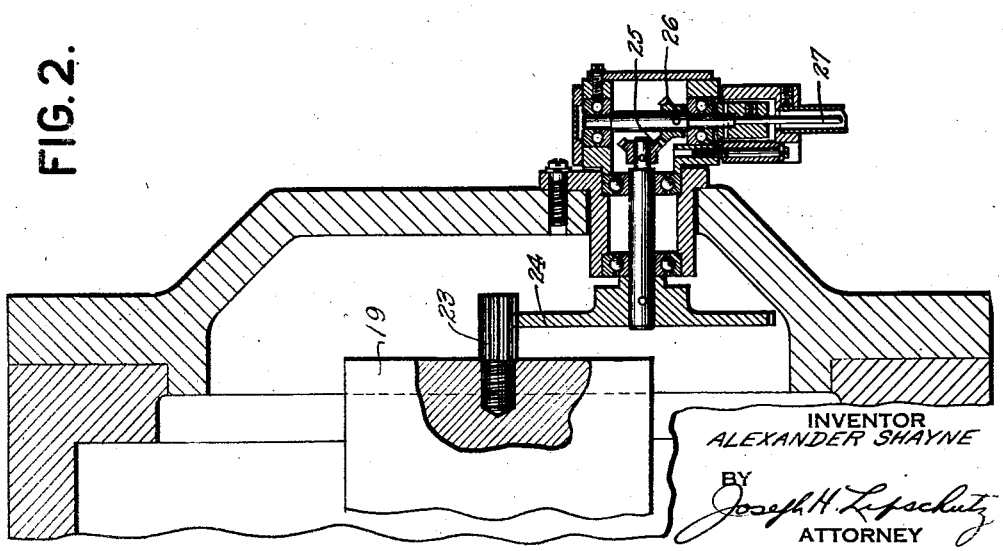
Fig. 2 is a vertical section of an enlarged detail showing the driving mechanism from the screw down motor to the preload indicator.

Referring to Fig. 1, there is shown one end frame member 10 of a rolling mill stand which may be one in a series of ten such stands comprising a continuous rolling mill. A similar frame is spaced back of the frame 10 shown, and between said frames there are mounted the rolls of the mill. The mill may be of the four-high type consisting of two pressure rolls 11 and 12 and two back-up rolls 13 and 14. The back-up rolls are mounted in suitable bearing blocks 15, 16 slideable in the frame, and within the blocks 15, 16 there are slideably mounted other blocks 17, 18 in which the pressure rolls 11, 12 are supported. Pressure between the pressure rolls is transmitted by way of the back-up rolls by the application of pressure to block 15 by means such as a screw 20 which engages said block and is actuated from a screw down motor 21 through suitable gearing contained in housing 22.

As the screw down motor operates, it is designed to drive a shaft 19 by way of gearing (not shown). A gear 23 is fixed in shaft 19 concentric therewith and drives through gears 24, 25, 26 a flexible shaft 27 which is designed to drive a counter 28. The counter is so adjusted that when the pressure rolls 11 and 12 just touch, the counter reads zero. Increasing pressure, causing preload between the rolls, will cause the counter to operate in a direction to indicate plus figures (from 0000 up), each of the units indicating vertical movement of the screw and, therefore, elongation of the mill stand frame of .001". Thus, as shown, the counter indicates that there is a preload of .050". If the screw-down motor is allowed to remain set in this position, the operator sees at all times by reading the instrument in Fig. 3 just what his preload is, in this case .050".

A strip of material of given thickness reaches the mill stand from the preceding mill stand, and by reason of the fact that the instrument shows preloading of .050", it may be assumed that this mill stand is either No. 9 or No. 10 in the series of stands. Material of a given thickness reaches this stand and it is known that when the rolls are given a preload pressure corresponding to a downward movement of the screw of .050", the strip will be reduced to a predetermined thickness as it passes through the work rolls. This reduction will cause increase in strain on the mill stand frame. Thus, if the preload on the frame has caused it to elongate .050", and the material is to have a thickness of .050" after it passes through the rolls, the total elongation of the frame must be .100". If it were possible to measure the actual increment of elongation of the frame while the sheet was passing through the mill stand, the operator could know that when such instrument showed .050" the material was of that given final thickness. At present, however, there is only the pressure gauge which measures the strain in the frame, and, as stated in the introduction hereto, this strain is not a straight line function of the load between the rolls.

By referring to Fig. 4 it will be seen that a graph is obtained by plotting the relative elongation of the mill stand frame against the pressure which is applied between the rolls. Beginning at point zero when the rolls just touch and increasing the pressure between the rolls, it will be seen that initially relatively large elongation of the frame is obtained in response to relatively small pressure load application between the rolls. Thus, for instance, the application of approximately 300,000 pounds pressure will cause a frame elongation of .050". To obtain the next .050" of elongation of the frame, that is, from .050" to .100", requires approximately 500,000 additional pounds pressure. It will thus be seen that equal increments of load between the rolls yields progressively less increments of frame elongation, or stated conversely, to obtain equal increments of frame elongation requires progressively greater applications of load between the rolls as the elongation increases. The plot of load against frame elongation therefore results in an exponential curve and is not a straight line. This makes it apparent why thickness of material (i. e., elongation of the frame) cannot be read directly from the pressure gauge. A given increment of pressure corresponds to different frame elongation increments (and, hence, material thicknesses) depending upon where in the graph of Fig. 4 the pressure increment occurs.

The nature of the pressure indicator 29 disclosed in the said Shayne and Wittkuhns application is such that the pointer 30 shows pressure between the rolls only when material is passing through the mill stand, and therefore the pressure indicator does not indicate preload because in the interval when no material is passing through the mill stand the preload pressure indication is taken out by a compensating mechanism and the pointer 30 is returned to a position opposite the zero index 40. The pressure indicator will therefore indicate only increments in load caused by the material passing between the preloaded rolls. The problem now arises as to the amount of pressure increment necessary to cause a further elongation of the frame to a degree corresponding to the thickness of the material passing through the rolls. From the above discussion it is apparent that the amount of additional pressure which must be exerted between the rolls to effect the desired thickness of the material depends upon the amount of preload, that is to say, the position on the exponential graph of Fig. 4 where the pressure increment takes place. Thus if an additional increment of .050" is desired when the rolls just touch, the graph of Fig. 4 shows us that approximately 300,000 pounds additional pressure must be exerted by the sheet passing through the rolls. If, however, there is a .050" preload, then an additional .050" stretch of the mill stand frame will require 500,000 pounds pressure increment; and, further, if there is .100" preload, an additional .050" stretch of the frame will require 800,000 pounds additional pressure. Assume, therefore, that the mill stand frame is preloaded corresponding to .050" elongation of the mill stand frame and it is desired that the thickness of the material passing through this mill stand shall be .050". This means that the finished material must stretch the frame an additional .050", making a total stretch of .100". If the operator had only the pressure indicator with the pointer 30 before him operating from a scale indicating pounds of pressure, he could refer to a graph such as Fig. 4 and determine that the additional stretch of the mill stand frame from .050" to .100" requires an increment of pressure of 500,000 pounds. He could then read his pressure indicator as the material passes through the mill stand and if the pressure indicator shows 500,000 pounds then he knows that the thickness of the material passing through this mill stand is the desired .050". If greater pressure is shown it means that the sheet is too thick, and in this case the operator will operate the screw-down motor of the preceding mill stand to increase the preloading pressure of said preceding stand, and therefore decrease the thickness of the material reaching the present stand; or the operator may, after the material has passed through the stand, operate the screw down motor of the present stand to increase the preloading pressure. The opposite direction of correction would be taken if the pressure indicator showed less than 500,000 pounds.

It will be apparent that the above procedure requires the operator to refer to a separate chart for the purpose of determining his reference point. By the present invention, means are provided whereby the operator can set the desired increment in mill-stand-elongation immediately and without referring to a chart and can tell whether or not the desired thickness is being rolled. For this purpose there is provided in cooperative relation with the index 40 and the pointer 30 of the pressure indicator a scale S concentric with the pivotal center 51 of the pressure indicator and calibrated in accordance with the graph of Fig. 4 to show increments of frame elongation in response to load. Thus it will be seen that the angular distance between zero and .010" on scale S is considerably less than the angular increment between .090" and .100" stretch. This means that the pointer 30 must travel a greater distance, that is, that there must be a greater increment of pressure to effect the .010" stretch of the frame between .090" and .100" than to effect the ten point increment between zero and .010". In other words, the scale S is not a linear but an exponential curve embodying the relationship between load and stretch of the mill stand shown in the graph of Fig. 4 and corresponds to load as indicated by the pointer 30 of the pressure indicator plotted against stretch of the mill stand frame as indicated by scale S.

The net result of providing scale S calibrated against load in accordance with the graph of Fig. 4 is that if there is preload, as, for instance a .050" preload as shown, scale S may be turned by operating knob 55, which is geared to said scale, until the index 50 is opposite the zero mark 40 of the pressure indicator, as shown. If it is now desired to roll a sheet of .050" thickness it means an additional elongation of the mill stand frame to this amount, or a total elongation of .100". The amount of pressure increment which must be generated by the sheet passing through the mill stand in order to yield this thickness is determined by the pointer 30 moving until it is opposite index 100 on scale S. Since the scale S is calibrated in accordance with the graph of Fig. 4, the operator does not need to refer to any outside data to determine the amount of pressure increment which the pressure indicator should indicate to yield the desired thickness. He merely observes whether or not the pointer 30 is opposite 100 on the scale S. If it is, then he knows that the material is of the proper thickness to add .050" to the elongation of the frame and therefore that the material has a finished thickness of .050" as it passes out of the mill stand. If the pointer 30 indicates less than 100 on scale S then the material is too thin, while if it indicates more than 100, then the material is too thick.

In order to facilitate further the transmission of information to the operator as to the thickness of the sheet passing through the rolls, a pointer 70 may be set by hand relative to the periphery of scale S on the outside thereof adjacent the index of the scale S which designates the desired thickness. If the preload is .050" and the material is to be rolled so as to leave the stand with a thickness of .050", the pointer 70 is set opposite .100", the total elongation of the frame. Thus the operator has only to observe whether or not the pressure indicator pointer 30 is exactly opposite pointer 70 to know whether the sheet passing through the rolls is of the desired thickness or greater or less than the same. To set pointer 70, the latter may be carried by a geared ring 71 to which is geared a knob 72.

While the scale S has been described as operable by hand through knob 55 to set the same so that the preload as shown by counter 28 is opposite the zero index 40 of the pressure indicator, this setting may be accomplished automatically by the operation of preloading. For this purpose, the mechanism of Fig. 5 may be employed and shows that a cam 60 is mounted on the shaft 61 of the counter. Said cam is designed as shown in Fig. 6 and is also in accordance with the graph of Fig. 4 so that equal increments of pressure will produce progressively decreasing increments of movement of the cam periphery. The said cam is connected by a flexible band 62 to a cylinder 63 which carries the scale S directly or is geared thereto by gearing 65, 66. In the latter case, scale S is carried in a suitable manner by gear 66. It will now be seen that as the counter is operated in accordance with the movements of the screw-down motor to stretch the frame in accordance with the preload, the scale S will be operated relative to pressure pointer 30 and zero index 40. Thus when a preload of .050" has been applied, the scale S has automatically been operated to bring the numeral 50 opposite the pressure indicator pointer 30 and the zero index 40.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a continuous rolling mill stand comprising a frame and rolls mounted in said frame, the load between said rolls causing elongation of said frame, equal increments of loading producing progressively smaller increments of stretch of said frame, a pressure responsive means including an indicator adapted to move through equal increments in response to equal increments of load, a scale with which said indicator co-acts, said scale being calibrated to give actual increments of frame elongation for equal increments of load.

2. In a continuous rolling mill stand comprising a frame, rolls mounted in said frame and means for applying preloading pressure to said rolls, the load between said rolls causing elongation of said frame, equal increments of loading producing progressively smaller increments of elongation of said frame, a pressure responsive means including an indicator adapted to move through equal increments in response to equal increments of load, said pressure responsive means being adapted to be unresponsive to preloading pressure, a scale with which said indicator co-acts, said scale being calibrated to give actual increments of frame elongation for equal increments of load, and means for moving said scale to cause said indicator in its unactuated position to co-act with the indication on said scale corresponding to the stretch of said frame due to preload.

3. In a continuous rolling mill stand comprising a frame and rolls mounted in said frame, the load between said rolls causing elongation of said frame, equal increments of loading producing progressively smaller increments of elongation of said frame, a pressure responsive means including an indicator adapted to move through equal increments in response to equal increments of load, a scale with which said indicator co-acts, said scale being calibrated to give actual increments of frame elongation for equal increments of load, and an index settable with respect to said scale to a position corresponding to the elongation of said frame to be caused by material of predetermined thickness passing through the rolls.

4. In a continuous rolling mill stand comprising a frame, rolls mounted in said frame and means for applying preloading pressure to said rolls, the load between said rolls causing elongation of said frame, equal increments of loading producing progressively smaller increments of elongation of said frame, a pressure responsive means including an indicator adapted to move through equal increments in response to equal increments of load, said pressure responsive means being adapted to be unresponsive to preloading pressure, a scale with which said indicator co-acts, said scale being calibrated to give actual increments of frame elongation for equal increments of load, means for moving said scale to cause said indicator in its unactuated position to co-act with the indication on said scale corresponding to the elongation of said frame due to preload, and an index settable with respect to said scale to a position corresponding to the additional elongation of said frame to be caused by material of predetermined thickness passing through the rolls.

5. In a continuous rolling mill stand comprising a frame, rolls mounted in said frame and means for applying preloading pressure to said rolls, the load between said rolls causing elongation of said frame, equal increments of loading producing progressively smaller increments of elongation of said frame, a pressure responsive means including an indicator adapted to move through equal increments in response to equal increments of load, said pressure responsive means being adapted to be unresponsive to preloading pressure, a scale with which said indicator co-acts, said scale being calibrated to give actual increments of frame elongation for equal increments of load, and means whereby said preloading means moves said scale to cause said indicator in its unactuated position to coact with the indication on said scale corresponding to the elongation of said frame due to preload.

6. In a continuous rolling mill stand comprising a frame, rolls mounted in said frame and means for applying preloading pressure to said rolls, the load between said rolls causing elongation of said frame, equal increments of loading producing progressively smaller increments of elongation of said frame, a pressure responsive means including an indicator adapted to move through equal increments in response to equal increments of load, said pressure responsive means being adapted to be unresponsive to preloading pressure, a scale with which said indicator co-acts, said scale being calibrated to give actual increments of frame elongation for equal increments of load, means whereby said preloading means moves said scale to cause said indicator in its unactuated position to co-act with the indication on said scale corresponding to the elongation of said frame due to preload, and an index settable with respect to said scale to a position corresponding to the additional elongation of said frame to be caused by material of predetermined thickness passing through the rolls.

ALEXANDER SHAYNE.